United States Patent [19]

Huisman

[11] Patent Number: 5,301,048
[45] Date of Patent: Apr. 5, 1994

[54] ACTIVE MATRIX DISPLAY DEVICE WITH SCHOTTKY CONTACT SWITCHING ELEMENTS

[75] Inventor: Frederikus R. J. Huisman, Eindhoven, Netherlands

[73] Assignee: U.S. Philips Corporation, New York, N.Y.

[21] Appl. No.: 967,921

[22] Filed: Oct. 28, 1992

Related U.S. Application Data

[63] Continuation of Ser. No. 651,180, Feb. 6, 1991, abandoned.

[30] Foreign Application Priority Data

Feb. 7, 1990 [NL] Netherlands .......................... 9000290

[51] Int. Cl.$^5$ ................................ G02F 1/13
[52] U.S. Cl. ........................................ 359/60; 359/87; 257/53; 257/54
[58] Field of Search ............... 357/4, 23.7, 15, 2, 357/13, 58; 350/333, 336, 334; 340/784; 359/54, 57, 58, 60, 87; 257/53, 54, 449

[56] References Cited

U.S. PATENT DOCUMENTS

| | | | |
|---|---|---|---|
| 4,655,552 | 4/1987 | Tagashi et al. | 350/334 |
| 4,666,252 | 5/1987 | Yaniv et al. | 350/333 |
| 4,738,513 | 4/1988 | Nishiura t al. | 350/334 |
| 4,907,040 | 3/1990 | Kobayashi et al. | 357/15 |
| 4,943,143 | 7/1990 | Yamashita | 350/333 |
| 4,952,948 | 8/1990 | Martens et al. | 350/334 |
| 5,032,831 | 7/1991 | Kuijk | 340/784 |
| 5,056,894 | 10/1991 | Kuijk et al. | 359/60 |

FOREIGN PATENT DOCUMENTS

| | | | |
|---|---|---|---|
| 62-173435 | 7/1987 | Japan | 350/334 |
| 63-303322 | 12/1988 | Japan | 350/333 |
| 1-177515 | 7/1989 | Japan | 340/784 |
| 1-216319 | 8/1989 | Japan | 350/334 |

OTHER PUBLICATIONS

Szydlo et al., "New amorphous silicon nonlinear element for liquid crystal display addressing", Appl. Phys. Lett. 44(2), Jan. 15, 1984.

*Primary Examiner*—William Mintel
*Assistant Examiner*—Minhloan Tran
*Attorney, Agent, or Firm*—Paul R. Miller

[57] ABSTRACT

By arranging a Schottky diode so that it is sensitive to grazing light only in the back-bias mode, a switching element is obtained which, when used in, for example an active matrix LCD display, has a current-voltage characteristic which is comparable to that of a zener diode and can be driven in a reset mode.

9 Claims, 1 Drawing Sheet

ACTIVE MATRIX DISPLAY DEVICE WITH SCHOTTKY CONTACT SWITCHING ELEMENTS

This is a continuation of application Ser. No. 07/651,180, filed Feb. 6, 1991, now abandoned.

BACKGROUND OF THE INVENTION

The invention relates to an active matrix display device comprising an electro-optical display medium between two supporting plates, a system of pixels arranged in rows and columns, with each pixel being formed by picture electrodes provided on the facing surfaces of the supporting plates, and a system of row and column electrodes for presenting selection and data signals by means of which a range of voltages dependent on the electro-optical display medium can be presented across the pixels for the purpose of picture display, said device comprising means for applying, prior to selection, an auxiliary voltage across the pixels, which auxiliary voltage is beyond or on the edge of the voltage range to be used for picture display.

A display device of this type is suitable for displaying alphanumerical information and video information.

Such a display device is described in U.S. Pat. No. 5,032,831 issued Jul. 16, 1991 filed by the Applicant. In this display device, asymmetrical non-linear switching elements are used for applying voltages across the pixel. In one of the embodiments shown, both the picture display voltage and said auxiliary voltage are presented by means of a zener diode, which is operated in the breakdown mode for presenting the auxiliary voltage.

The technologies which are used for realizing active matrices of switching elements for liquid crystal devices (amorphous silicon, polycrystalline silicon technology) are, however, generally less suitable for realizing zener diodes with a reproducible current-voltage characteristic in the forward direction. Moreover, the light sensitivity, particularly of amorphous silicon, is found to be detrimental.

SUMMARY OF THE INVENTION

A display device of the type described in the opening paragraph is characterized according to the invention in that said means for applying voltages comprises a semiconductor element comprising a layer of semiconductor material in contact with a connection conductor to form a Schotty contact over at least a part of a surface of the semiconductor material, and in that the connection conductor outside said part is separated from the semiconductor material by a layer of insulating material.

The invention is based inter alia on the recognition that the light sensitivity of the semiconductor material, which is considered to be detrimental, can be utilized to obtain a switching element having a current-voltage characteristic which is comparable with that of a zener diode, at least for the range used. The Schottky contact guarantees a satisfactorily reproducible current-voltage characteristic in the forward direction so that the voltage across a pixel can be adjusted accurately. Simultaneously, sufficient charge carriers are generated by (grazing) incident light for supplying enough current at a comparatively low back-bias voltage for discharging or charging to a voltage value beyond the range to be used for display. The switching element thus obtained may be considered, in effect an anti-parallel circuit of a Schottky diode and a photodiode.

For an optimum operation of the photodiode, the connection conductor is preferably made of an opaque material such as, for example tungsten, molybdenum, platinum or nickel.

A display device according to the invention can be driven with similar control signals as those described in U.S. Pat. No. 5,032,831, referred to above.

Further aspects of the invention will be described and explained in greater detail with reference to the drawings and an embodiment.

DESCRIPTION OF THE PREFERRED EMBODIMENTS

Figure 1:
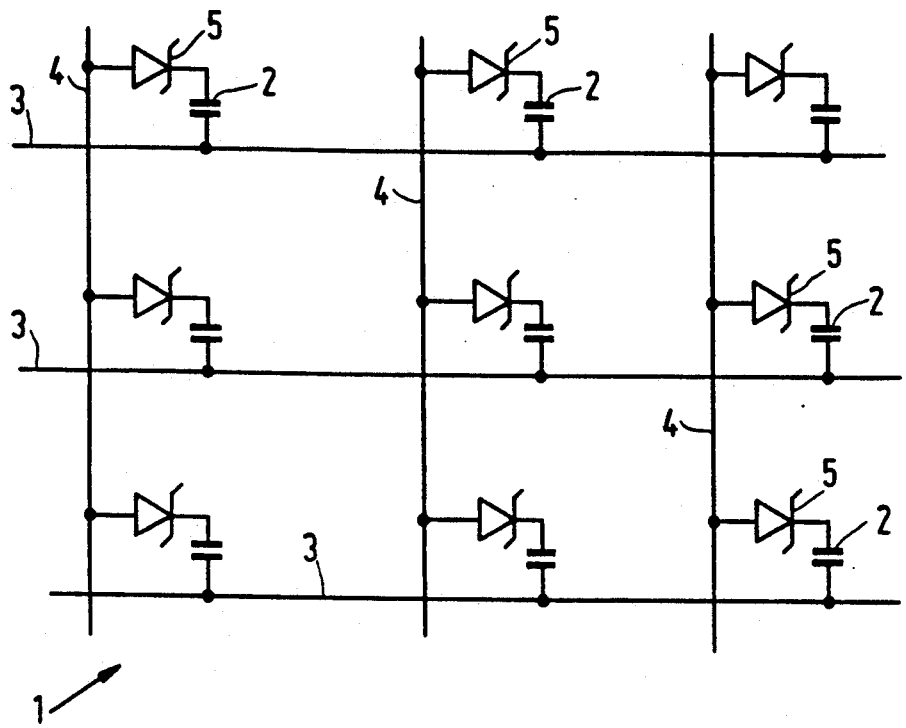
FIG. 1 shows diagrammatically an active matrix display device according to the invention.

FIG. 1 shows diagrammatically the electrical equivalent circuit of an active matrix display device 1 according to the invention. Pixels 2, arranged in a matrix, are located at the area of crossings of row electrodes 3 and column electrodes 4, while the pixels 2 can be supplied with a voltage via switching elements 5, which in this embodiment connect the column electrodes 4 to the pixels 2. The switching elements 5 are shown as Schottky diodes, but in practice they form an anti-parallel circuit of a Schottky diode and a photodiode.

Figure 2:
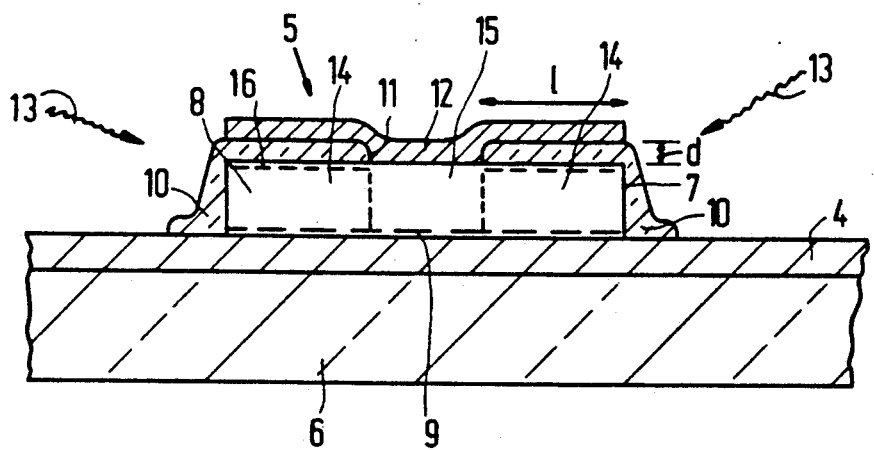
FIG. 2 shows a cross-sectioned elevation view of a switching element for such a display device.

FIG. 2 shows in a diagrammatic cross-section a part of a picture display device according to the invention. The switching element 5 is contacted at its lower side by a column conductor 4, which extends across a support or substrate 6 of, for example, glass or quartz. The actual semiconductor body 7 of, for example, amorphous silicon, may extend on both sides of the conductor 4 across the substrate.

The conductor 4 is a 250 nm thick chromium track in this embodiment, which track is obtained by vapour deposition or sputtering techniques. A layer of amorphous silicon 8 (approximately 500 nm thick) is provided on this track in the conventional manner, which layer is substantially electrically intrinsic, except for a thin region 9 (approximately 60 nm thick) at the lower side which is highly doped n-type for the purpose of making satisfactory electrical contact to track 4 separate semiconductor areas 7 for the array of switching elements are obtained by covering the entire substrate 6, and subsequently patterning the layer thus obtained in a photolithographic etching step.

Subsequently, a passivating layer 10 is provided, for example a layer of $SiO_2$ having a thickness of 0.4 $\mu$m, by means of PECVD (Plasma Enhanced Chemical Vapour Deposition), or a layer of polyimide. Contact holes 11 are formed in this layer 10 by means of photolithographic techniques at the area of a Schottky contact to be formed, whereafter a layer 12 of molybdenum, tungsten or another suitable, preferably opaque metal is provided and patterned.

If such a switching unit 5 is driven in the forward direction, the current-voltage characteristic (FIG. 3) is exclusively determined by the Schottky contact which is formed by the semiconductor body 7 and the (Schottky) metal layer 12. This Schottky contact and hence the forward characteristic are hardly influenced by grazing incident light (denoted by arrows 13 in FIG.

2) because the thickness d of the passivating layer 10 is much smaller than the total length 1 by which the opaque metal layer 12 covers the semiconductor body 7 (d<<1). Although charge carriers are generated by the incident light in the peripheral areas 14 of the semiconductor body, they do not reach the central area 15 where the actual current flows.

Figure 3:
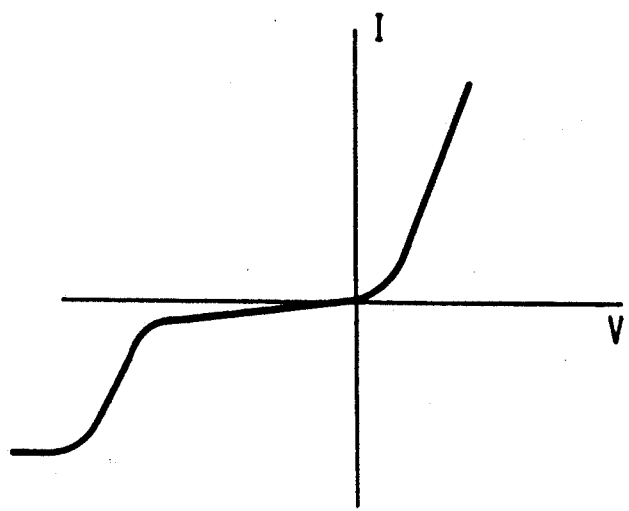
FIG. 3 shows graphically a current-voltage characteristic of a switching element according to FIG. 2.

When a sufficiently high back-bias is applied to the metal layer 12, it is possible that holes accumulate in the amorphous silicon along the interface of the passivating layer 10 and the metal layer 12. As a result, a conducting channel 16 is introduced by which an effective collection of the charge carriers generated by the light is possible. This becomes manifest in a photocurrent and a current-voltage characteristic as shown in FIG. 3.

The current-voltage characteristic thus obtained is comparable to that of a zener diode so that a display device comprising a switching element according to FIG. 2 can be used in a similar manner to the zener diode as described in U.S. Pat. No. 5,032,831.

I claim:

1. An active matrix display device comprising
   (a) an electro-optical display between two supporting plates having facing surfaces,
   (b) a system of pixels defined by picture electrodes arranged in rows and columns on one of said supporting plates,
   (c) a system of row and column electrodes for presenting selection and data signals to said picture electrodes,
   (d) switching means between each row or column electrode and a corresponding pixel for generating a current-voltage characteristic comparable to a zener diode, said switching means including a light sensitive semiconductor material providing an anti-parallel circuit of both a forward driving Schottky diode and a photodiode providing a back-bias photo-current driven by incident light.

2. An active matrix display device according to claim 1, wherein said switching means includes said light sensitive semiconductor material in electrical contact with said each row or column electrode, a passivating layer of insulating material covering at least parts of a top surface of said semiconductor material, and an opaque electrical conductor in contact with said top surface free of said passivating layer, said opaque electrical conductor also being in contact with a corresponding picture electrode for said pixel.

3. An active matrix display device according to claim 2, wherein said opaque electrical conductor contacting said semiconductor layer provides said Schottky diode.

4. An active matrix display device according to claim 3, wherein said Schottky diode is provided in an approximately central portion of said light sensitive semiconductor material, and wherein said passivating layer covers peripheral portions of said top surface.

5. An active matrix display device according to claim 3, wherein said passivating layer has a thickness much smaller than a total length of said passivating layer on said light sensitive semiconductor material, said opaque electrical conductor covering said total length.

6. An active matrix display device according to claim 2, wherein said opaque electrical conductor is one of tungsten, molybdenum, platinum, and nickel.

7. An active matrix display device according to claim 1, wherein said light sensitive semiconductor material is amorphous silicon.

8. An active matrix display device comprising
   (a) an electro-optical display between two supporting plates having facing surfaces,
   (b) a system of pixels defined by picture electrodes arranged in rows and columns on one of said supporting plates
   (c) a system of row and column electrodes for presenting selection and data signals to said picture electrodes,
   (d) switching means between each row or column electrode and a corresponding pixel for generating a current-voltage characteristic comparable to a zener diode, said switching means including a light sensitive semiconductor material providing an anti-parallel circuit of both a forward driving Schottky diode and a photodiode providing a back-bias photo-current driven by incident light,
   wherein said switching means includes said light sensitive semiconductor material in electrical contact with each said row or column electrode, a passivating layer of insulating material covering at least parts of a top surface of said semiconductor material, and an opaque electrical conductor in contact with said top surface free of said passivating layer, said opaque electrical conductor also being in contact with a corresponding picture electrode for said pixel,
   wherein said opaque electrical conductor contacting said semiconductor layer provides said Schottky diode,
   wherein said passivating layer has a thickness much smaller than a total length of said passivating layer on said light sensitive semiconductor material, said opaque electrical conductor covering said total length, and
   wherein said photocurrent is generated at said parts of said semiconductor material beneath said passivating layer.

9. An active matrix display device comprising
   (a) an electro-optical display between two supporting plates having facing surfaces,
   (b) a system of pixels defined by picture electrodes arranged in rows and columns on one of said supporting plates
   (c) a system of row and column electrodes for presenting selection and data signals to said picture electrodes,
   (d) switching means between each row or column electrode and a corresponding pixel for generating a current-voltage characteristic comparable to a zener diode, said switching means including a light sensitive semiconductor material providing an anti-parallel circuit of both a forward driving Schottky diode and a photodiode providing a back-bias photo-current driven by incident light,
   wherein said switching means includes said light sensitive semiconductor material in electrical contact with each said row or column electrode, a passivating layer of insulating material covering at least parts of a top surface of said semiconductor material, and an opaque electrical conductor in contact with said top surface free of said passivating layer, said opaque electrical conductor also being in contact with a corresponding picture electrode for said pixel, and
   wherein a thin region of said light sensitive semiconductor material in electrical contact with said row or column electrode is highly doped n-type.

* * * * *